United States Patent
Branaman

Patent Number: 6,015,247
Date of Patent: Jan. 18, 2000

[54] ARTICLE ASSEMBLY AND ALIGNMENT MACHINE AND METHOD

[76] Inventor: Vincent E. Branaman, 13907 E. 253rd St., Peculiar, Mo. 64075

[21] Appl. No.: 08/992,451

[22] Filed: Dec. 17, 1997

[51] Int. Cl.[7] .............................. B23B 35/00; B23B 41/00
[52] U.S. Cl. ......................... 408/1 R; 29/466; 29/525.12; 29/559; 144/93.1; 144/365; 269/43; 269/155; 269/266
[58] Field of Search ............................... 408/1 R, 42, 51, 408/52, 53, 103, 108; 144/93.1, 92, 35.1, 365; 29/281.5, 34 B, 464, 466, 559, 525, 12; 269/155, 32, 266, 43, 227

[56] References Cited

U.S. PATENT DOCUMENTS

| | | |
|---|---|---|
| 1,487,195 | 3/1924 | Blackman . |
| 1,975,250 | 10/1934 | Calpha et al. . |
| 2,250,845 | 7/1941 | Stefano . |
| 2,253,413 | 8/1941 | Young . |
| 2,299,851 | 10/1942 | Schafer et al. . |
| 2,679,177 | 5/1954 | Gepfert ..................................... 269/227 |
| 2,723,579 | 11/1955 | Johnson ................................... 269/155 |
| 2,943,653 | 7/1960 | Crider ..................................... 408/108 |
| 4,061,437 | 12/1977 | Strange et al. . |
| 4,199,283 | 4/1980 | Perry . |
| 4,257,166 | 3/1981 | Barker et al. . |
| 4,419,031 | 12/1983 | Palma ..................................... 408/108 |
| 4,644,985 | 2/1987 | Weaver ................................... 269/227 |
| 4,736,934 | 4/1988 | Grech ..................................... 269/155 |
| 4,750,248 | 6/1988 | Brown . |
| 4,917,549 | 4/1990 | Geernaert . |
| 4,952,101 | 8/1990 | Coombs . |
| 5,017,056 | 5/1991 | Yagi et al. . |
| 5,060,363 | 10/1991 | Headrick . |
| 5,158,406 | 10/1992 | Ulinskas . |
| 5,217,331 | 6/1993 | Ericksen . |
| 5,230,592 | 7/1993 | Degen et al. . |
| 5,471,724 | 12/1995 | Susnjara et al. . |
| 5,507,607 | 4/1996 | Ericksen et al. . |
| 5,544,872 | 8/1996 | Schuit ..................................... 269/266 |
| 5,551,677 | 9/1996 | Puettmer et al. ........................ 269/266 |
| 5,590,986 | 1/1997 | Juang . |
| 5,598,878 | 2/1997 | Wirth, Jr. et al. . |

FOREIGN PATENT DOCUMENTS

| | | | |
|---|---|---|---|
| 292712 | 11/1988 | European Pat. Off. ............... | 408/103 |

*Primary Examiner*—Daniel W. Howell
*Attorney, Agent, or Firm*—Mark E. Brown; Litman, Kraai & Brown, LLC

[57] ABSTRACT

An article assembly an alignment machine includes a table comprising a base frame and a work surface mounted thereon. A jig system includes X-axis and Y-axis jig subsystems each including clamps slidable on the work surface. The jig subsystems are actuated by pneumatic piston-and-cylinder units. An article forming system includes a gang drill mounted on the base frame below the work surface and adapted for raising and lowering between engage and disengage positions.

13 Claims, 6 Drawing Sheets

ARTICLE ASSEMBLY AND ALIGNMENT MACHINE AND METHOD

BACKGROUND OF THE INVENTION

1. Field of the Invention

The present invention relates generally to assembly and alignment machines, and in particular to a machine and method for assembling and aligning drawers and their components.

2. Description of the Prior Art

Various types of machines are used to assemble and align the component parts of articles of manufacture. For example, jigs of various types are commonly used to secure components in predetermined positions while they are being fastened together. Jigs lend themselves to mass production techniques because consistency and accurate alignment can be achieved, along with relatively efficient utilization of labor and material resources. Jigs can particularly be useful where considerable labor would otherwise be required to manually align components for fastening, including manual measuring and repositioning steps as required to achieve satisfactory alignment. Manually measuring and repositioning the components can be quite time consuming. Such manual techniques have the further disadvantage of their accuracy depending upon the skill and experience of the worker.

With modern fastening equipment such as pneumatic fasteners and automated welders, the process of properly positioning the components for final assembly is often a relatively time consuming portion of the assembly process.

The manufacture of drawer units for millwork comprising cabinets and the like is an example of a manufacturing process which can be relatively labor intensive, particularly in projects where the cabinets are custom made for each job. The custom sizing often required for fitting cabinets and their drawer units into specific spaces tends to increase the custom labor requirements of this type of manufacturing. Moreover, it is often desirable for the finished units to have a certain uniform appearance which can only be achieved by properly aligning the components in assembly.

In addition to jigs, forming tools are often used in mass production operations. For example, the Stefano U.S. Pat. No. 2,250,845 and the Schafer et al. U.S. Pat. No. 2,299,851 both disclose gang drills. Such multiple tools can increase the efficiency of manufacturing operations by reducing labor and by increasing accuracy in repetitive operations. A disadvantage with many prior art mass production machines relates to their specialized nature and difficulties encountered in reconfiguring them for different sizes of articles of manufacture. Moreover, prior art manufacturing equipment often tended to be relatively expensive and complicated.

Heretofore there has not been available an article assembly and alignment machine and method with the advantages and features of the present invention.

SUMMARY OF THE INVENTION

In the practice of the present invention, an article assembly and alignment machine is provided which includes a jig system for positioning and clamping the components of a drawer unit in a predetermined configuration. The jig system includes X-axis and Y-axis jig subsystems for clamping a drawer box and a drawer front in a predetermined relation on a work surface. The X-axis and Y-axis jig subsystems are actuated and moved between engaged and released positions by pneumatic piston-and-cylinder units. An article forming system includes a gang drill mounted below the work surface and moveable between raised and lowered positions engaged and disengaged from the drawer unit components. A table includes a base frame mounting a work surface and the jig and article forming systems.

In the practice of the method of the present invention, a table is provided with a work surface for receiving the drawer front or face of a drawer unit on top of which a drawer box is placed with a front panel thereof against the drawer front. The drawer front and the front panel are simultaneously drilled for handle mounting screws and are fastened together. The box and the drawer front are secured together in their finished positions by X-axis and Y-axis jig subsystems. A gang drill is raised and lowered into and out of engagement for drilling the handle mounting screw holes.

OBJECTS AND ADVANTAGES OF THE INVENTION

The principal objects and advantages of the present invention include: providing a machine for article assembly and alignment; providing such a machine which is particularly well adapted for manufacturing drawer units; providing such a machine which is particularly well adapted for mounting drawer fronts on drawer unit boxes; providing such a machine which is adapted for gang drilling drawer handle and drawer pull mounting screw holes; providing such a machine which is adapted for quickly and efficiently centering a drawer unit box on a drawer front; providing such a machine which can be operated with a relatively few pneumatic valve controls; providing such a machine which utilizes readily-available components; providing such a machine which is relatively efficient in operation, economical to manufacture and particular well adapted for the proposed use thereof; providing a method of article assembly and alignment; providing such a method which is particular well adapted for producing drawer units; providing such a method which can reduce the labor requirements in a manufacturing operation; providing such a method which can produce relatively precise results in a manufacturing operation; and providing such a method which is economical, efficient and particularly well adapted for a proposed application thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
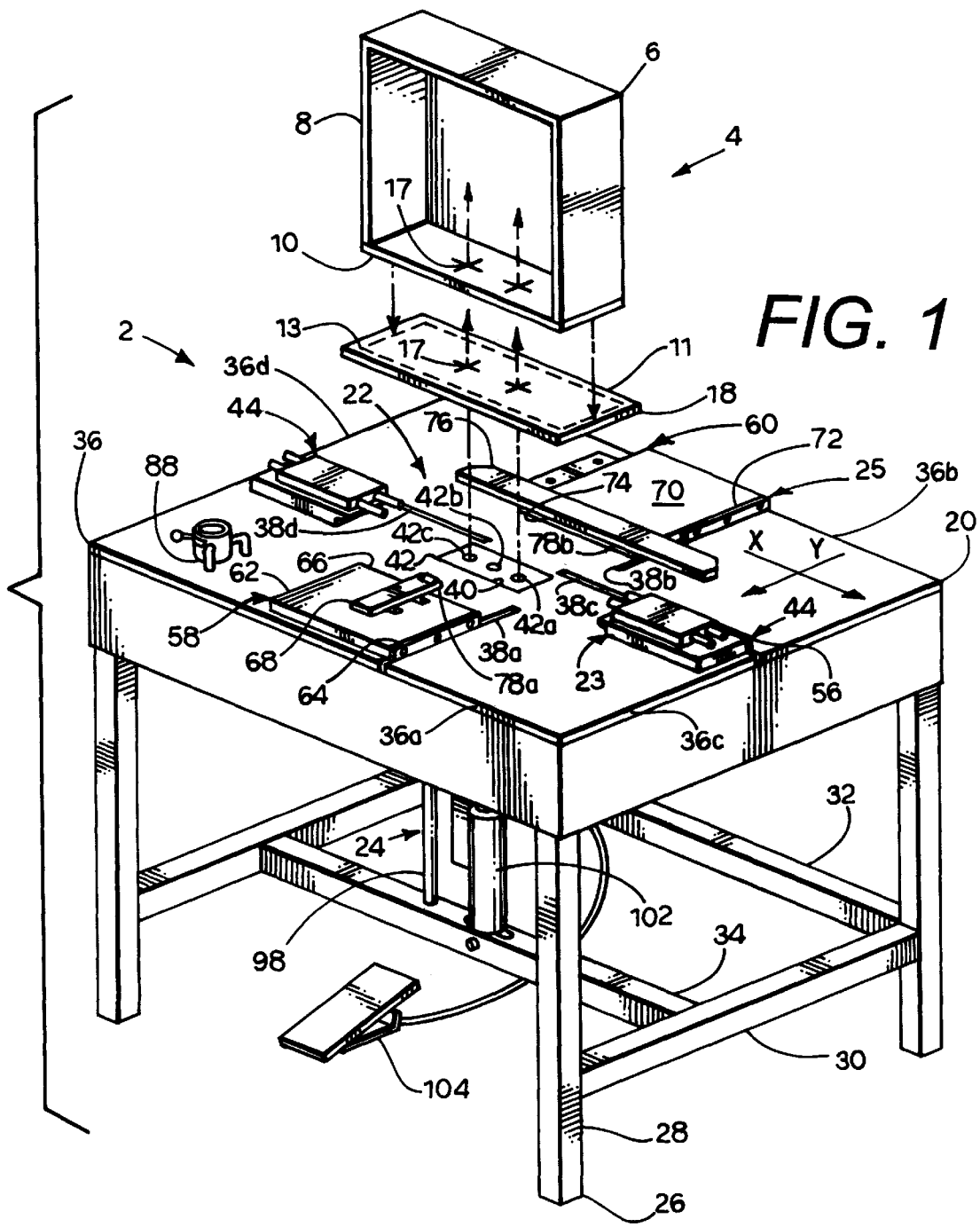
FIG. 1 is an upper, front, right side perspective view of an article assembly and alignment machine embodying the present invention, with an exploded drawer unit shown thereover.
Figure 2:
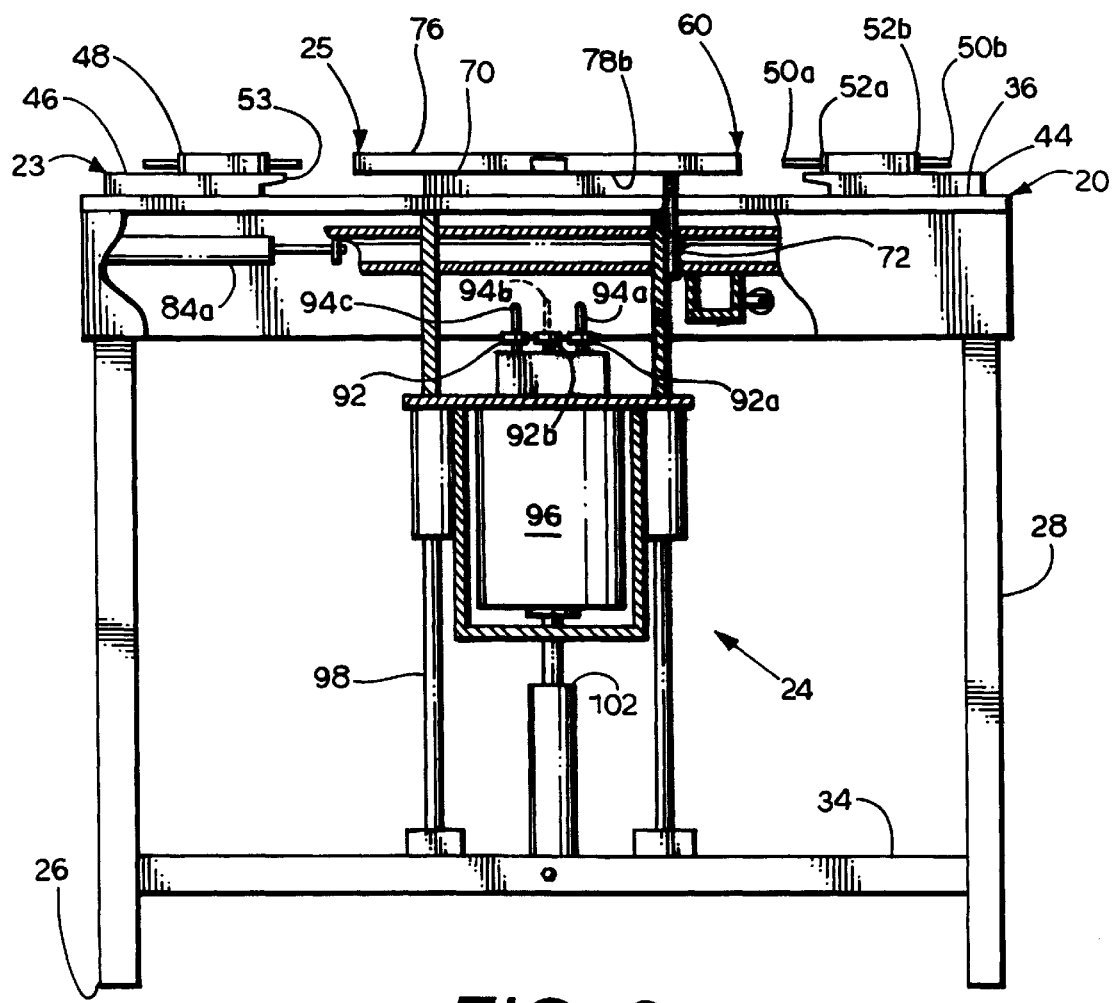
FIG. 2 is a front elevational view thereof, with portions broken away to reveal internal construction.
Figure 3:
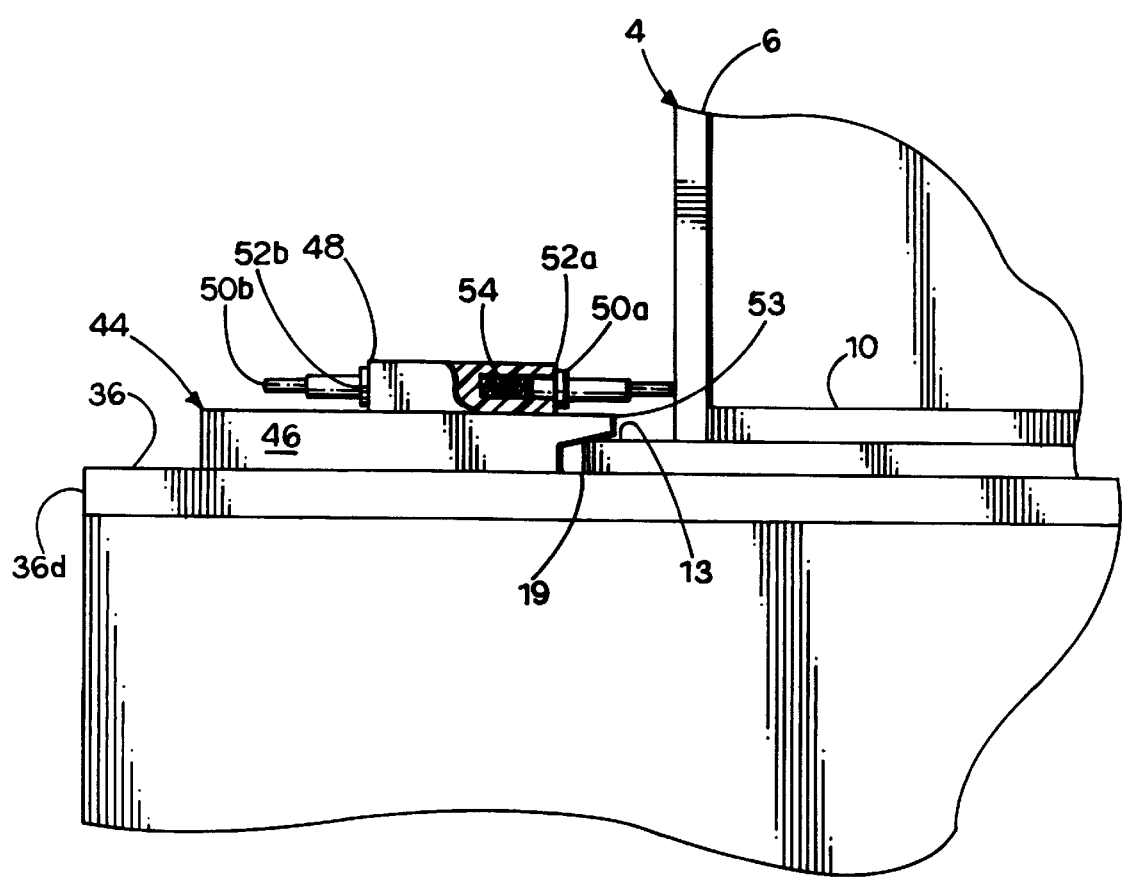
FIG. 3 is a fragmentary, cross-sectional view thereof, particularly showing a drawer unit secured by a clamp assembly thereof.
Figure 4:
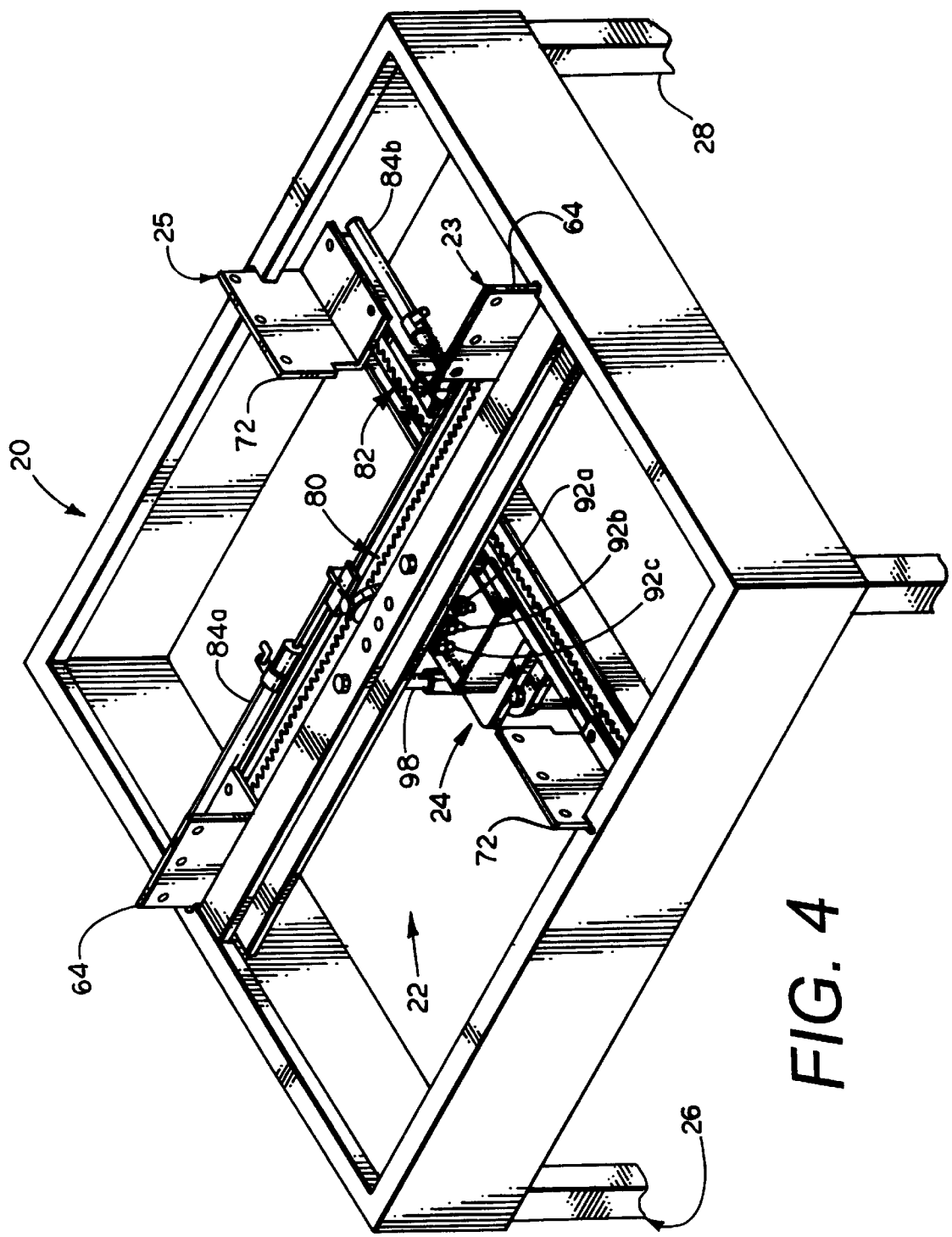
FIG. 4 is an upper, front right side prospective view of the machine, with the work surface thereof removed to reveal internal construction.
Figure 5:
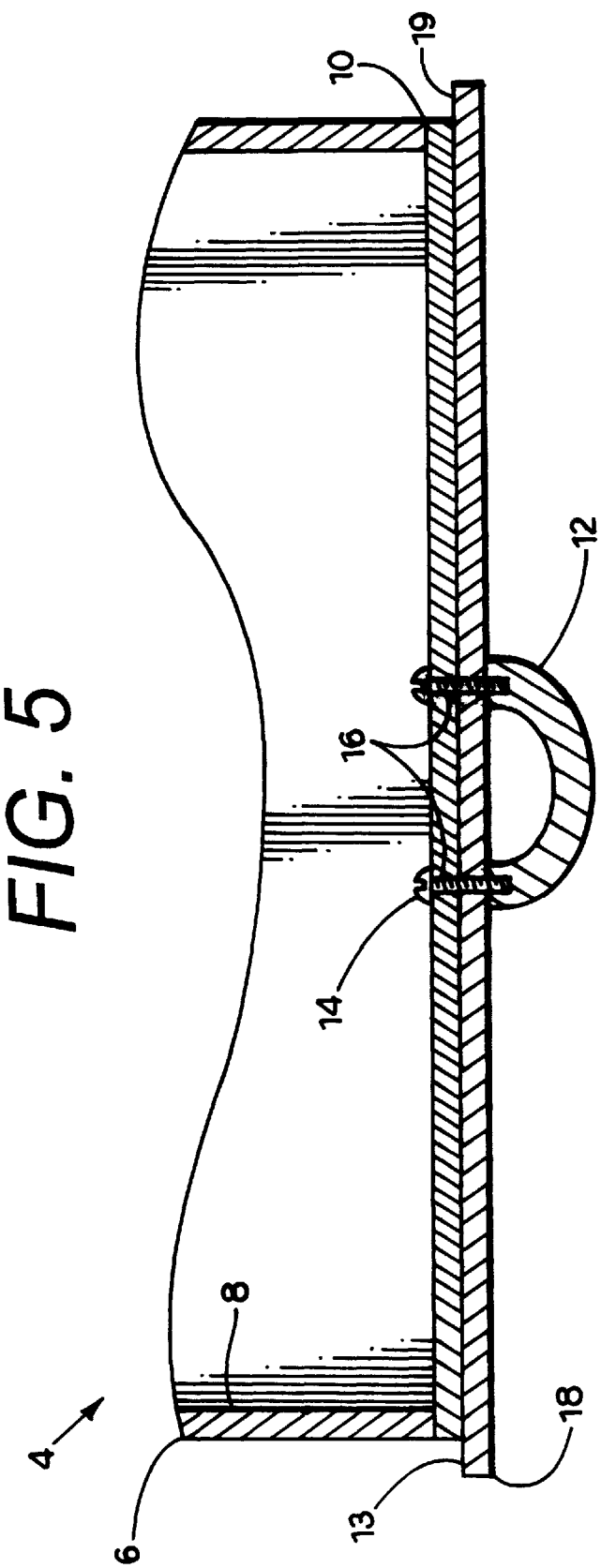
FIG. 5 is a fragmentary, cross-sectional view of the drawer assembly, particularly showing the arrangement for fastening a handle thereon.
Figure 6:
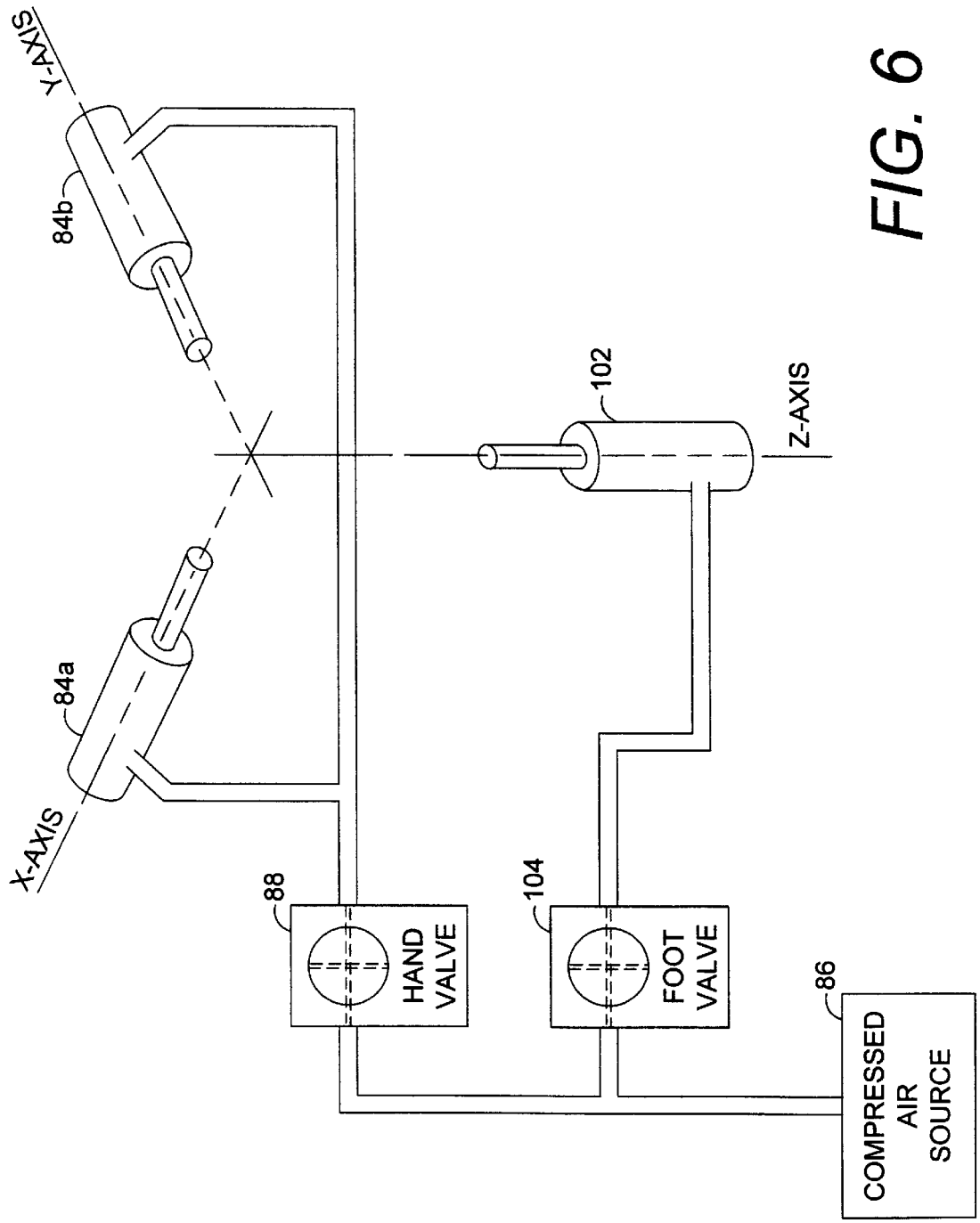
FIG. 6 is a schematic diagram of a pneumatic control system thereof.

I. Introduction and Environment.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 2 generally designates a machine for assembling and aligning an article of manufacture, such as a drawer unit 4. The drawer unit includes a drawer box 6 with an open top 8 and a box front panel 10. A handle 12 is mounted on the front of a drawer front or face 18 by handle screws 14 extending through holes or receivers 16 in the drawer box front panel 10 and the drawer front 18, which is mounted thereon.

The machine 2 generally comprises a table 20, a jig system 22 and an article forming system 24.

II. Table 20.

The table 20 includes a base frame 26 with legs 28, side pieces 30, a back piece 32 and a cross piece 34 extending between the side pieces 30 transversely across the base frame 26.

The table 20 includes a work surface 36 mounted on the legs 28 and including front, back and opposite side edges 36a,b,c,d respectively. A plurality of slots 38a,b,c,d extend inwardly from respective work surface edges 36a,b,c,d. A rectangular central opening 40 mounts a drill plate 42 with drill receivers 42a,b,c.

III. Jig System 22

The jig system 22 includes an X-axis jig subsystem 23 including a pair of x-axis clamp assemblies 44 each having a clamp base 46 slidable on the work surface 36 and a clamp block 48 mounted on the base 46. Each clamp block 48 includes inner and outer pairs of plungers 50a,b respectively protruding from inner and outer block base side edges 52a,b. The plungers are connected to springs 54 which bias them outwardly for engagement with the drawer box 6. Each block inner side edge 52a is undercut to form an overhanging lip 53 thereat. The X-axis clamp assemblies 44 include slides 56 slidably received in respective side slots 38c,d.

Clamping with respect to the Y-axis is accomplished by a Y-axis jig subsystem 25 including front and back clamp assemblies 58, 60 respectively. The front clamp assembly 58 includes a base 62 slidably positioned on the work surface 36 by a front clamp slide 64 slidably received in the front slot 38a. The base 62 includes a front engagement edge 66 and mounts a front retainer 68 protruding inwardly (rearwardly) over the front engagement edge 66. The back clamp assembly 60 includes a base 70 with a back engagement edge 74. A back clamp retainer strip 76 is mounted on top of the back clamp assembly base 70 and protrudes inwardly (forwardly) from the back engagement edge 74 thereof. The retainers 68, 76 overhang respective engagement edges 66, 74 to form front and back clamp assembly recesses 78a,b respectively for capturing the drawer front 18 around a perimeter 19 thereof.

The X-axis clamp assemblies 44 are interconnected for synchronized movement in and out by an X-axis rack-and-pinion gear assembly 80 mounted on the table 20 below the work surface 36. The front and back clamp assemblies 58, 60 are interconnected for synchronized movement in and out by a Y-axis rack-and-pinion gear assembly 82 mounted on the table 20 below the work surface 36. Pneumatic piston-and-cylinder units 84a,b are connected to the table 20 and to the X-axis and Y-axis rack-and-pinion gear assemblies 80 and 82 respectively for advancing and retracting the clamp assemblies 44, 58, 60 between retracted and engaged positions.

A compressed air source 86 is connected to the piston-and-cylinder units 84a,b via a hand air valve 88 with engaged and disengaged positions for advancing and retracting the piston-and-cylinder units 34a,b and the clamp assemblies 44, 58, 60 connected thereto by the rack-and-pinion gear assemblies 80, 82.

IV. Article Forming System 24

The article forming system 24 comprises a gang drill 90 with arbors 92a,b,c adapted for selectively mounting drill bits 94a,b,c respectively. The arbors 92 are driven by a drill motor 96 vertically slidably mounted on a pair of guide rods 98 extending from the base frame cross piece 34 to the underside of the work surface 36. The drill motor 96 is raised and lowered between extended and retracted positions by a pneumatic piston-and-cylinder unit 102 connected to the compressed air source 86 by a foot pedal valve 104. As with the piston-and-cylinder units 84a,b, the drill piston-and-cylinder unit 102 can comprise either a single-acting, automatic return unit or a double-acting extend-and-retract unit, and can operate either pneumatically or hydraulically. Other means for engaging the clamp assemblies 44, 58, 60 and raising the gang drill 90 include electric motors, manual cranks, levers, gears, cables, chains, sprockets, etc.

V. Article Assembly and Alignment Method

In the practice in the method of the present invention, the jig system 22 is first configured in its open (release) position with the gang drill 90 lowered. A drawer front 18 is then placed face down on the work surface 36 generally over the central opening 40 therein.

The drawer box 6 is then placed on the drawer front 18 with the drawer box front panel 10 engaging the upwardly facing backside of the drawer front 18. Since the box front panel 10 is smaller in both height and width dimensions than the drawer front 18, a drawer front perimeter 19 is formed whereat the drawer front 18 extends beyond the box front panel 10 on all four sides to provide a reveal 13.

The gang drill 90 is normally configured either with outer drill bits 94a,c received in arbors 92a,c respectively, or, alternatively, with a single drill bit 94b received in the middle arbor 92b, depending upon whether the drawer handle 12 is a two-screw, loop-type handle or a single-screw, knob-type handle.

The operator then engages the clamp assemblies 44, 58, 60 by opening the air valve 98, thus extending the piston-and-cylinder units 94a,b. The drawer front perimeter 19 is captured under the block edge lips 53 and within the clamp assembly recesses 78a,b whereby the box front panel 10 is accurately centered on the drawer front 18. As the clamp assemblies 44,58, 60 advance inwardly, the drawer box 6 and the drawer front 18 are pushed into their proper positions, thus eliminating the tedious and time consuming manufacturing step of manually aligning the box front panel 10 and the drawer front 18. The plungers 50a,b are adapted to engage the drawer box 6 to maintain it in proper alignment. The X-axis clamp blocks 48 can be reversibly remountable on the clamp bases 46 to orient the outer pair of plungers 50b inwardly and vice versa.

With the drawer box 6 properly positioned on the drawer front 18, they can be securely affixed to each other by suitable fasteners, such as staples, screws, nails, adhesive, etc. For example, in high volume production work, pneumatic staple guns are commonly used for such assembly operations.

The operator then presses the foot pedal valve 104 to extend the piston-and-cylinder unit 102 and raise the gang drill 90 whereby the box front panel 10 and the drawer front 18 are drilled to form an aligned screw hole or holes 16 at the "X" marked locations 17 for receiving the handle mounting screws 14. The gang drill 80 can be lowered by releasing the foot valve 104 and the clamp assemblies 44, 58 and 60 can be released by releasing the clamp assembly hand valve 88. The drawer box 6 and the attached drawer front 18 can then be removed and the handle 12 mounted by inserting the mounting screws 14 from the inside of the drawer box 6 through the holes 16 and into the handle 12, thus completing the drawer unit 4.

It is to be understood that while certain forms of the present invention have been illustrated and described herein, it is not to be limited to the specific forms or arrangement of parts described and shown.

What is claimed and desired to be secured by Letters Patent is as follows:

1. A machine for assembling and aligning an article of manufacture including first and second components, which machine includes:
   a) a table including a work surface adapted to receive the article components;
   b) a jig system including a pair of clamp assemblies oppositely-disposed on said work surface and clamp assembly translation means for synchronizing the translation of the clamp assemblies between an open position of the jig system with the clamp assemblies spaced from the article components and a closed position engaging same, each said clamp assembly including:
      1) a base slidably mounted on the work surface and having an engagement edge adapted for engaging the article with the jig system in its closed position; and
      2) said base including an overhanging lip at the article eneazine edge; and
   c) an article forming system including means for forming the article of manufacture said article forming means including a cutting tool and said article forming system including reciprocating mounting means for mounting said cutting tool on said table for reciprocation between an engaged position above the level of said work surface and a disengaged position below the level of said work surface.

2. The machine according to claim 1 wherein said clamp assembly translation means comprises a rack-and-pinion gear assembly mounted on said table below said work surface and connected to said clamp assemblies.

3. The machine according to claim 1, which includes:
   a) said clamp assembly pair comprising an X-axis clamp assembly pair;
   b) a Y-axis clamp assembly pair oppositely-disposed on said work surface;
   c) an X-axis jig subsystem including said clamp assembly translation means; and
   d) a Y-axis jig subsystem connected to said Y-axis clamp assembly pair and being adapted for synchronizing the translation of the Y-axis clamp assemblies between an open position with the clamp assemblies spaced from the article components and a closed position engaging same.

4. The machine according to claim 1, which includes each said clamp assembly having:
   a) a slide connected to said base and to said translation means; and
   b) a block mounted on said base and including a plunger engaging the article with the jig system in its closed position.

5. The machine according to claim 1, which includes:
   a) said clamp assembly translation means including a pneumatic piston-and-cylinder unit connected to said work surface and to said clamp assemblies.

6. The machine according to claim 1 wherein each said clamp assembly includes:
   a) a block mounted on the base and including a spring-mounted plunger extending inwardly therefrom and adapted for engaging the article.

7. A method of assembling and aligning a drawer unit having a box with a drawer box front panel, a drawer box open top and a drawer front, which includes the steps of:
   a) providing a work surface;
   b) supporting said work surface on a base frame;
   c) placing said drawer front face down on said work surface;
   d) placing said drawer box on said work surface with said box front panel engaging said drawer front;
   e) providing an X-axis pair of clamp assemblies mounted on said work surface for sliding between a disengaged position and an engaged position engaging said drawer;
   f) synchronously biasing said clamp assemblies inwardly on said work surface into engagement with said drawer face and said drawer box;
   g) providing a pair of Y-axis clamp assemblies mounted on said work surface for sliding between a disengaged position and an engaged position engaging said drawer;
   h) providing an exposed perimeter of said drawer front surrounding said box front panel and forming a reveal;
   i) providing each said clamp assembly with an overhanging lip;
   j) engaging said drawer front perimeter with said overhanging lip to capture said drawer front;
   k) providing a gang drill with multiple drill arbors below said work surface;
   l) providing a plurality of drill passages in said work surface, each said passage being located over a respective drill arbor;
   m) mounting a predetermined number of drill bits in said drill arbors;
   n) raising said drill from a lower, disengaged position below said work surface to a raised, engaged position and drilling aligned screw holes in said drawer box front and said front panel;
   o) mechanically fastening said box front panel to said drawer front from inside said drawer box with said drawer unit located on said work surface;
   p) placing a handle on said drawer front panel; and
   q) inserting a screw through said aligned drill holes from inside said drawer box and into said drawer handle.

8. The machine according to claim 1, which includes:
   a) said cutting tool comprising a gang drill with a drill motor drivingly connected to a plurality of drill arbors; and
   b) said work surface including a plurality of openings each located over a respective drill arbor for passing a drill bit therethrough with said drill in its engaged position.

9. The machine according to claim 8 wherein said article forming system includes:
   a) a pair of guide rods each depending downwardly from said work surface and connected to said table;
   b) a pneumatic piston-and-cylinder unit connected to said table and to said gang drill;
   c) said gang drill being vertically slidably mounted on said guide rods;
   d) a pressurized air source; and
   e) an air valve connected to said pressurized air source and to said pneumatic piston-and-cylinder unit for selectively extending said pneumatic piston-and-cylinder unit to raise said gang drill from a lower, disengaged positioned to an upper, engaged position.

10. The machine according to claim 6, which includes:
   a) each said clamp assembly block of said pair of clamp assemblies having first and second sides and first and second pairs of spring-loaded plungers respectively extending outwardly therefrom.

11. The machine according to claim 3 wherein said Y-axis clamp assembly pair includes:
   a) a front clamp assembly having a clamp base slidably mounted on the work surface, an article-engaging back edge and a retainer mounted on top of the base and extending rearwardly from the article-engaging back edge thereof to form a front clamp assembly recess thereunder for capturing the article of manufacture; and
   b) a back clamp assembly including a clamp base slidably mounted on the work surface and having an article-engaging front edge, a retainer mounted on top of the back clamp assembly base and extending forwardly from said back article-engaging edge thereof to form a recess thereunder for capturing the article of manufacture.

12. The machine according to claim 11, which includes:
   a) a Y-axis pneumatic piston-and-cylinder unit connected to said table;
   b) a Y-axis rack-and-pinion gear assembly connected to said front and back clamp assemblies and to said Y-axis piston-and-cylinder unit;
   c) a compressed air source; and
   d) an air valve connected to said compressed air source and to said Y-axis piston-and-cylinder unit, said air valve having an engage position for communicating air to said piston-and-cylinder unit for biasing said front and back clamp assemblies to their closed positions and a release position with said piston-and-cylinder unit biasing said front and back clamp assemblies to their open positions.

13. A machine for assembling and aligning a drawer unit including: a drawer box with an open top and a box front panel; a drawer front mounted on the box front panel and extending outwardly therefrom at a drawer front perimeter forming a draw front reveal; a drawer handle; a drawer handle mounting screw mounting the drawer handle on the drawer front; and a handle screw receiver extending through the box front panel and the drawer front, which machine comprises:
   a) a table including:
      1) a base frame with a plurality of legs, a pair of side pieces each extending between a pair of legs, a back piece and a cross piece extending between the side pieces generally transversely with respect to the table;
      2) a work surface with front, back and opposite side edges and front, back and opposite side slots extending inwardly from said front, back and opposite side edges respectively;
      3) said work surface having a generally rectangular central opening; and
      4) a drill plate with a plurality of receivers, mounted in said work surface central opening;
   b) a jig system including an X-axis jig subsystem and a Y-axis jig subsystem;
   c) said X-axis jig subsystem including:
      1) a pair of X-axis clamp assemblies each having a clamp base slidably mounted on the work surface, a slide connected to the base and slidably received in a respective work surface slot, a block mounted on top of said base, and having first and second side edges and first and second pairs of spring-mounted plungers protruding from said first and second block side edges respectively and an inner engagement edge including an overhanging lip selectively receiving said drawer front perimeter;
      2) a rack-and-pinion gear assembly connected to said base frame under said work surface and mounting said slides; and
      3) a pneumatic piston-and-cylinder unit connected to said base frame and to said rack-and-pinion gear assembly for reciprocating said X-axis clamp assemblies between an engaged position with said overhanging lips capturing said drawer front perimeter at the sides thereof and with said plungers engaging said drawer box at sides thereof; and
   c) a compressed air source;
   d) a hand valve connected to the compressed air source and selectively connecting same to said X-axis and Y-axis piston-and-cylinder units for extending same; and
   e) an article forming system including:
      1) a gang drill with a drill motor connected to a plurality of arbors;
      2) a plurality of drill bits selectively mountable in said arbors;
      3) a pair of guide rods mounted on said base frame in parallel, spaced relation and extending vertically from said cross piece to said work surface, said gang drill being vertically slidably mounted on said guide rods.

* * * * *